Feb. 5, 1957  E. W. FLOSDORF  2,780,102
VACUUM GAGE
Filed Aug. 10, 1953
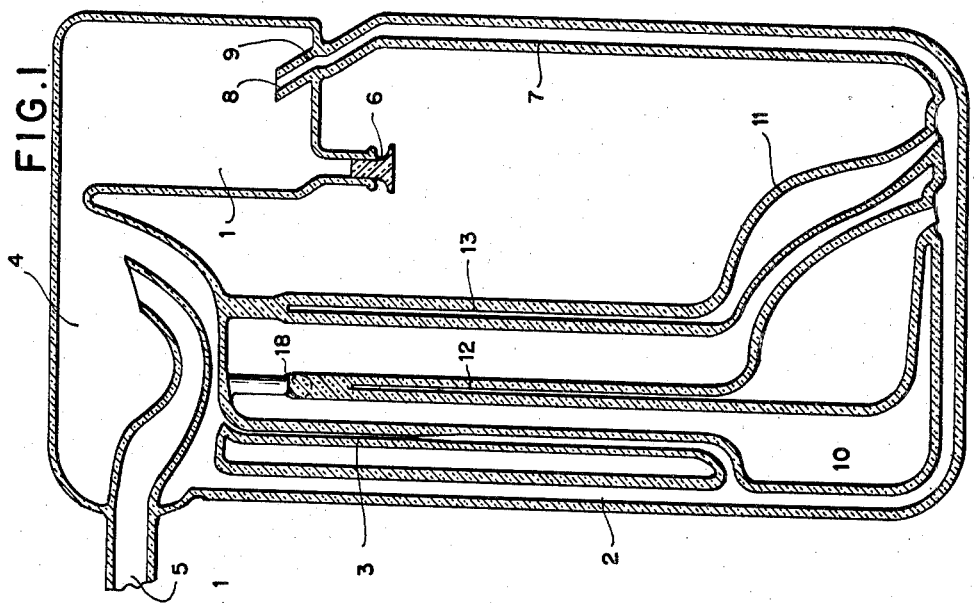
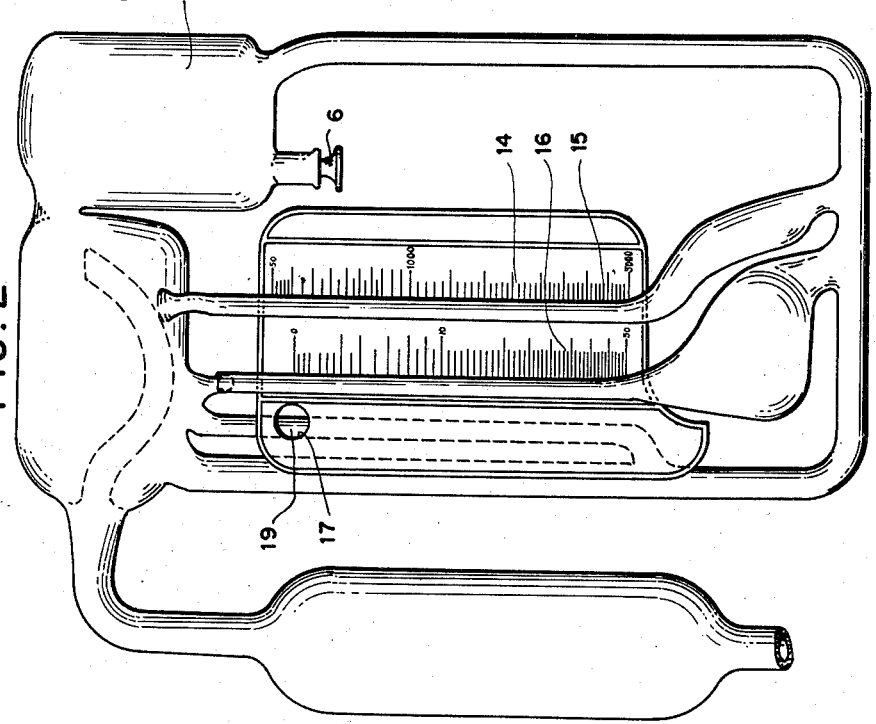
INVENTOR.
Earl W. Flosdorf
BY
Adams, Forward and McLean
ATTORNEYS

2,780,102

VACUUM GAGE

Earl W. Flosdorf, Forest Grove, Pa., assignor to F. J. Stokes Corporation, a corporation of Pennsylvania Application August 10, 1953, Serial No. 373,269

1 Claim. (Cl. 73—400)

This invention relates to improvements in vacuum gages of the type described in Patents 2,278,195, granted March 31, 1942, and Patent 2,542,076, granted February 20, 1951.

The gages of these two patents, which are McLeod type gages pivotally mounted, have come into wide use in view of their simplicity, accuracy and convenience in use. However, the gages have been relatively restricted in range. Thus, for example, they have been provided for measurements in the low pressure range, for example, from 0.01 to 50 microns or in a higher range, as for example, from 50 to 5000 microns, or intermediate ranges, or other selected ranges, but no really wide range gage which combines accuracy in the low pressure range with capacity to measure pressures in the relatively high pressure range has been available. Thus, gages adapted to measure pressures in the range of 50 to 5000 microns have not been really useful in the range below 50 microns because of lack of accuracy while gages which provide reasonably accurate readings in the 0.01 to 50 micron range have not been usable in the higher pressure ranges. This has been true despite the fact that the usefulness of a gage which would measure with reasonable accuracy pressures from say 0.01 to 5000 microns, while combining with that capacity the simplicity and ease of operation of the gages described in the aforementioned patents, has been obvious.

The present invention provides improvements in gages of this type which permit accurate readings over a wide range, from extremely low pressures to moderate pressures such as 5000 microns or more, without sacrifice of simplicity and ease of operation.

The present invention is based upon the discovery that a gage may be constructed with two measuring capillaries and but a single comparison capillary, providing the closed ends of the two measuring capillaries are properly positioned with respect to one another. In gages of the type described in Patent 2,278,195, the zero point for the measuring scale is determined by the position of the mercury meniscus in the comparison capillary, and the gages are so constructed as to permit adjustment of the relative position of the scale and the gage so that the scale may be properly positioned despite minor variations in the amount of mercury which is introduced into the gage. Once the scale is properly positioned for a given charge of mercury, no further adjustments in its position are required. I have found that this relationship holds true not only with respect to a measuring capillary of the same internal diameter as the comparison capillary, but also with respect to measuring capillaries of larger or smaller size, providing that the closed end of the capillary of different size is properly positioned with respect to the closed end of the measuring capillary of the same size as the comparison capillary. Thus, if the second (or third or fourth, etc.) measuring capillary is of larger internal diameter than the first measuring capillary and the comparison capillary, its closed end must be higher than the closed end of the first capillary, and its scale must have a zero point at a higher level than the scale for the first measuring capillary. Similarly, if the second (or third or fourth, etc.) measuring capillary is of smaller diameter than the first and the comparison capillary, its closed end must be at a lower level, and the zero point on its scale must be lower. It is not necessary that the comparison capillary be of the same internal diameter as either of the measuring capillaries, but in such event, it is necessary to have the closed ends of the measuring capillaries at properly selected levels and the zero points of the scales at properly selected points with respect to the mercury level in the comparison capillary. This involves some difficulties in construction and adjustment so that it is much simpler to have at least one of the measuring capillaries of the same inside diameter as the comparison capillary.

The invention will be further illustrated by reference to the appended drawings in which Fig. 1 illustrates the glass construction of the gage proper, while Fig. 2 illustrates the gage with the reading scale attached.

Except for the provision of a second compression chamber and attached measuring capillary, the gage illustrated is of substantially the design described and illustrated in Patents 2,278,195 and 2,542,076, so that detailed description of the fundamental construction is unnecessary.

Briefly stated, the gage includes a leveling bulb 1, a bypass tube 2, a comparison capillary tube 3, a trap chamber 4, a connection 5 for connection to the vacuum space and for introducing mercury into the gage, a plug 6 to facilitate emptying and cleaning the gage, a connection 7 between the leveling bulb and the measuring chambers, an extension 8 of this connection into the leveling bulb with a restricted passage 9, designed to function as described in Patent 2,542,076. In addition, the gage is provided with two compression chambers 10 and 11 and two measuring capillaries 12 and 13. The measuring capillaries 12 and 13 are somewhat in front of the comparison capillary 3 and the bypass 2 so that the scale, when mounted, will be behind the two measuring capillaries but in front of the comparison capillary and the bypass. The gage is also provided with the scale 14 provided with two scales 15 and 16, one for each of the measuring capillaries. It is also provided with a zero point 19, at the aperture 17, so that its position can be fixed with respect to the mercury level in the comparison capillary, to permit minor adjustments to take care of minor variations in the quantity of mercury introduced into the gage.

In the gage illustrated the measuring capillary 12 is of the same inside diameter as the comparison capillary 3, while the measuring capillary 13 is of larger inside diameter. The small measuring capillary is designed to measure relatively low pressures, and the large measuring capillary to measure relatively high pressures. Thus, conveniently, the small measuring capillary may be designed to measure pressures from 0.01 to 50 microns and the large capillary to measure pressures from 50 to 5000 microns. The closed end of the large capillary is at a higher level (when the gage is in the reading position) than the closed end of the small measuring capillary, and the difference between these levels is a function of two factors (1) the material of which the capillary is made, and (2) the difference in inside diameter of the two capillaries. Mention is made of the difference in the materials because I have found that for small capillaries it is desirable to use frosted tubing to minimize sticking of the mercury during rapid filling and emptying of the capillary, whereas with the larger capillaries this is unnecessary. Also, the greater the difference between the inside diameters of the capillaries, the greater must be the difference in the levels of the closed ends of the capillary tubes. A typical gage of the invention designed with two scales, one for measuring pressures of 0.01 to 50 microns and the other from 50 to 5000 microns may have the following dimensions:

Inside diameter of comparison and measuring capillaries, 0.50±0.01 mm. using precision bore frosted capillary tubing.

Compression chamber 10, 725±10 grams of mercury capacity at 18° C.

Measuring capillary 13, glass capillary shrunken on a mandrel with the upper 142 mm. of length having a capacity of 4.200±0.020 grams of mercury at 18° C. (approximate inside diameter, 1.70 mm.).

Capacity of compression chamber 11 plus measuring capillary 13, 120.5±2.5 grams of mercury at 18° C.

Distance from top of measuring capillary 12 to top of measuring capillary 13, 25±0.5 mm.

Overall height of gage not over 305 mm.
Passageway 7, inside diameter, 4 mm.
Height of extension 8 into leveling bulb, 13 mm.
Diameter of opening 9, 1.75 mm.
Inside diameter of bypass tube 2, 5 mm.
Length of measuring capillary 12, 120 mm.
Length of measuring capillary 13, 145 mm.

In the attached drawings, the leveling bulb and trap are substantially to scale, the inside diameters of the various tubes and capillaries are not. The gage as described, requires approximately 2 lbs. of mercury.

The gages may be made in different sizes, or for different pressure ranges, the length and inner diameters of the capillaries, size of the compression chambers, etc., being determined in the conventional way. I have found it most convenient to determine the difference in levels of the closed ends of the measuring capillaries empirically, and have found it will vary depending on whether the tubing is frosted or not, and on the inside diameters of the capillaries.

In construction of the gage, a convenient way to properly adjust the positions of the top of the large measuring capillary and the small measuring capillary, is to have the glass blower construct the gage with the upper end of the small measuring capillary open, and then seal it by drawing in a plug of thermoplastic cement to the desired point. Thus, if at 18 the tube is left open and a thermoplastic plug is drawn into it, it is effectively sealed and at the same time the position of the closure is readily positioned properly.

I claim:

In a pivotally mounted McLeod type vacuum gage adapted to contain mercury as a compressing agent and having a leveling bulb and one comparison capillary, at least two compression chambers each with an attached measuring capillary, said measuring capillaries having different inside diameters, with the closed end of a measuring capillary of given inside diameter (when the gage is in reading position) higher than that of a measuring capillary of smaller inside diameter and lower than that of a measuring capillary of larger inside diameter, and a reading scale for each measuring capillary, the zero points of the reading scales being at different levels corresponding to the levels of the closed ends of the respective measuring capillaries.

References Cited in the file of this patent

UNITED STATES PATENTS

| | | |
|---|---|---|
| 2,542,076 | Flosdorf | Feb. 20, 1951 |

FOREIGN PATENTS

| | | |
|---|---|---|
| 589,226 | Great Britain | June 13, 1947 |
| 1,010,602 | France | Mar. 26, 1952 |

OTHER REFERENCES

Dunoyer: "Vacuum Practice," D. Van Nostrand Co., New York, 1926, pp. 66, 67 and 68.

Zeitschrift für Technische Physik, vol. 24, No. 2, 1943, page 30.

Instruments, vol. 19, November 1946, pages 674 and 676.